(12) United States Patent
Chong et al.

(10) Patent No.: US 11,803,545 B1
(45) Date of Patent: Oct. 31, 2023

(54) RUNTIME STATISTICS FEEDBACK FOR QUERY PLAN COST ESTIMATION

(71) Applicant: SAP SE, Walldorf (DE)

(72) Inventors: Jaehyok Chong, Seoul (KR); Young Goo Cho, Seoul (KR); Ki Hong Kim, Seoul (KR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/849,446

(22) Filed: Jun. 24, 2022

(51) Int. Cl.
*G06F 16/2453* (2019.01)
*G06F 16/22* (2019.01)
*G06F 16/2457* (2019.01)
*G06F 16/28* (2019.01)

(52) U.S. Cl.
CPC .... *G06F 16/24542* (2019.01); *G06F 16/2246* (2019.01); *G06F 16/24573* (2019.01); *G06F 16/284* (2019.01)

(58) Field of Classification Search
CPC .......... G06F 16/24542; G06F 16/2246; G06F 16/24573; G06F 16/284
See application file for complete search history.

(56) References Cited

U.S. PATENT DOCUMENTS

| 2004/0015478 | A1* | 1/2004 | Pauly | G06F 16/2246 |
| 2006/0248046 | A1* | 11/2006 | Galindo-Legaria | G06F 16/24549 |
| 2008/0133458 | A1* | 6/2008 | Zabback | G06F 16/24545 715/764 |
| 2008/0253306 | A1* | 10/2008 | Manion | H04L 45/54 370/255 |
| 2011/0029508 | A1* | 2/2011 | Al-Omari | G06F 16/24542 707/718 |
| 2015/0006509 | A1* | 1/2015 | Shao | G06F 16/2462 707/719 |
| 2018/0124048 | A1* | 5/2018 | Yoo | H04L 9/3236 |

OTHER PUBLICATIONS

"Canonical Form," Wikipedia, https://en.wikipedia.org/wiki/Canonical_form, printed Mar. 8, 2022, 7 pages.
Chaudhuri, et al., "Evaluating Top-k Selection Queries," Proceedings of the 25th VLDB Conference, Edinburgh, Scotland, 1999, 12 pages.
Moerkotte, et al., "On the Correct and Complete Enumeration of the Core Search Space," SIGMOD'13, Jun. 22-27, 2013, pp. 493-504.

(Continued)

*Primary Examiner* — Kuen S Lu
(74) *Attorney, Agent, or Firm* — Klarquist Sparkman, LLP

(57) ABSTRACT

A computer implemented method can execute a first query plan for a query, obtain statistics for internal nodes of a first query tree representing the first query plan, receive a second query tree representing a second query plan for the query, search for a matching internal node of the first query tree for a selected internal node of the second query tree, and responsive to finding the matching internal node of the first query tree, apply the statistics for the matching internal node of the first query tree to the selected internal node of the second query tree for estimating cost of the second query plan during query optimization of the query. Related systems and software for implementing the method are also disclosed.

19 Claims, 12 Drawing Sheets

(56) References Cited

OTHER PUBLICATIONS

"Notations for the Physical Query Plan," http://www.mathcs.emory.edu/~cheung/Courses/554/Syllabus/5-query-opt/notations.html#:~:text=Physical, printed May 16, 2022, 5 pages.

"Overview: Query Optimization," www.mathcs.emory.edu/~cheung/Courses/554/Syllabus/5-query-opt/intro.html, printed May 16, 2022, 4 pages.

"Queries for DFS of a subtree in a tree," https://www.geeksforgeeks.org/queries-for-dfs-of-a-subtree-in-a-tree/, printed May 12, 2022, 18 pages.

"Query Optimization in Centralized Systems," https://www.tutorialspoint.com/distributed_dbms/distributed_dbms_query_optimization_centralized_systems.htm, printed Mar. 8, 2022, 3 pages.

"Query rewriting methods and examples," IBM Documentation, https://www.ibm.com/docs/en/db2/10.5?topic=process-query-rewriting-methods-examples, printed May 16, 2022, 3 pages.

"Relational Algebra for Query Optimization," https://www.tutorialspoint.com/distributed_dbms/distributed_dbms_relational_algebra_query_optimization.htm, printed Mar. 8, 2022, 8 pages.

"Search Normalization," Splunk Documentation, https://docs.splunk.com/Documentation/Splunk/8.2.6/Search/Searchnormalization, printed May 18, 2022, 5 pages.

"SQL/Group By," GeeksforGeeks, https://www.geeksforgeeks.org/sql-group-by/, printed May 10, 2022, 8 pages.

"String.prototype.normalize()—JavaScript," MDN, https://developer.mozilla.org/en-US/docs/Web/JavaScript/Reference/Global_Objects/String/normalize, printed May 11, 2022, 5 pages.

"Subtree of all nodes in a tree using DFS," GeeksforGeeks, https://www.geeksforgeeks.org/sub-tree-nodes-tree-using-dfs/, printed May 12, 2022, 15 pages.

\* cited by examiner

RUNTIME STATISTICS FEEDBACK FOR QUERY PLAN COST ESTIMATION

BACKGROUND

A query plan (also referred to as "query execution plan") is a sequence of steps that a database management system (DBMS) executes in order to complete a query. When a query is run for the first time in the DBMS, the query can be compiled by a query optimizer to generate a corresponding query plan, which can be stored in memory called query plan cache, or simply plan cache. Thus, when the same query is run again, the DBMS does not need to regenerate the query plan. Instead, it can reuse the cached query plan stored in the query plan cache, thereby improving efficiency of the DBMS.

Query optimization refers to the overall process of attempting to choose a most efficient query plan, among many candidate query plans, to execute a query. For cost-based query optimization schemes, a query optimizer can rank the candidate query plans from the lowest cost to the highest cost (e.g., in terms of usage of system resources, such as I/O, CPU, memory, etc.), and select the query plan with the lowest cost for execution. The cost-based query optimization often collects and/or estimates statistics on tables and indexes involved in a query and uses those statistics to estimate costs of query plans. However, errors can be introduced when estimating data statistics, especially for result tables of intermediate operations of query plans. As a result, the query plan generated by the query optimizer may not be optimal after all or even close. Thus, there remains a need for an improved technology for more accurately determining data statistics associated with query plans.

DETAILED DESCRIPTION

Example 1—Overview of Query Optimization

Figure 1:
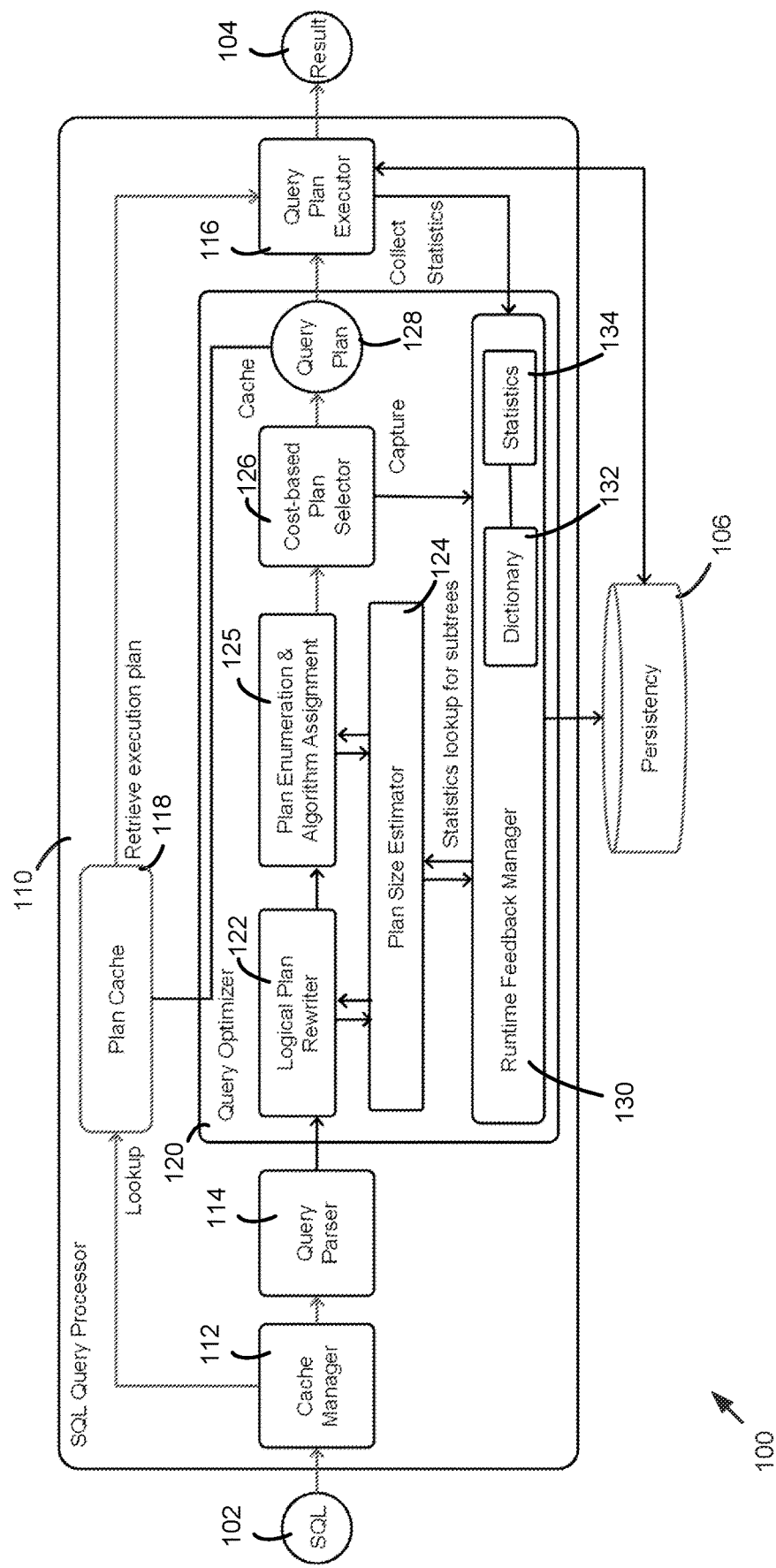
FIG. 1 is an overall block diagram of an example database management system supporting runtime query plan statistics feedback for query optimization.

After receiving a query, the query optimizer can create an internal representation of the query as a query tree including a plurality of nodes and edges linking the nodes. The nodes can include leaf nodes and one or more internal nodes. A leaf node has no child nodes. In contrast, an internal node has one or more child nodes. The root of the query tree, or root node, can be regarded as a special internal node.

The query tree denotes a relational algebra expression. Specifically, tables involved in the query can be represented as leaf nodes. The relational algebra operations can be represented as internal nodes. The root node represents the query as a whole. When a query plan is executed, an internal node can be executed when its operand tables are available. The internal node can then be replaced by a result table generated by the operation represented by the internal node. This process can continue for all internal nodes until the root node is executed and replaced by the result table, which can be returned as query results.

A single query can be executed through different algorithms or re-written in different forms and represented in different query tree structures by the query optimizer. Specifically, the query optimizer can use various equivalence rules to generate many different relational algebra expressions for the same query. An equivalence rule ensures that expressions of two forms are the same or equivalent because both expressions produce the same output. These different relational algebra expressions (which have different query tree structures) generate the same output to the query. Thus, different query trees associated with these different relational algebra expressions represent different query plans (also referred to as "candidate query plans") for the query. For simplicity, the nodes of a query tree representing a query plan can also be referred to as nodes of the query plan as described hereinafter.

The aim of a query optimizer is to select a query plan (from many candidate query plans) that yields optimal performance. Performance of a query plan can be described in terms of cost, which can be time (e.g., time required to execute the query plan) and/or burden on computing resources (e.g., processing power and/or memory expended to execute the query plan). Cost-based query optimization chooses the query plan with the lowest cost among all candidate query plans. In practice, although the terms "optimal" and "optimize" are used, the actual best plan may not be selected, but the selected plan is deemed better than others based on data available to the optimizer.

To evaluate a cost of a query plan, the query optimizer can estimate data statistics for nodes of the query plan, and use such statistics in a cost model to calculate the cost of the query plan. Some statistics, e.g., cardinality, can indicate size of tables. Some statistics, e.g., distinct count, skewness, etc., can indicate data distribution within tables.

However, errors can be introduced when estimating data statistics, especially for internal nodes of the query trees. For example, while data statistics of leaf nodes can be accurately obtained by scanning the tables represented by the leaf nodes, result tables of the internal nodes are not available before executing the query plan and must be estimated. Estimation of data statistics (e.g., cardinality, distinct count, skewness, etc.) associated with internal nodes can be error prone if some assumptions are not true. For example, for size estimation of a result table of an internal node involving filtering of two attributes (e.g., data columns), selectivity of the two filters can be multiplied if the two attributes are independent. However, if the two attributes are correlated to each other, then multiplying selectivity of the two filters can introduce errors. As another example, although a histogram is often used to characterize data statistics in query trees, a histogram is not suited to represent statistics for highly skewed data (e.g., top-k value list may not capture the skewness of a data column) Sampling is another approach for estimating data statistics in query trees, particularly when dealing with large tables. However, statistics of sampled data may not represent statistics of the large tables when the data is under-sampled (e.g., some data may have zero sample when the distinct count is large). Furthermore, the estimation error of statistics introduced in one internal node can be cascaded/propagated to a parent node of the internal node, thus amplifying the estimation error of statistics associated with the parent node. As a result, the calculated cost of query plans may not be accurate, and the query plan generated by the query optimizer may be suboptimal.

The technology described herein provides a system and method for runtime statistics feedback for query plan cost estimation. Such system and method provide more accurate estimation of data statistics of query plans in an efficient manner, thus improving cost-based query plan optimization schemes in DBMS.

Example 2—Example Database System Supporting Runtime Statistics Feedback for Query Plan Cost Estimation FIG. 1 shows an overall block diagram of an example database management system 100 that can accurately and efficiently calculate query plan cost based on runtime statistic feedback.

As shown, the database management system 100 includes an SQL query processor 110 configured to receive an incoming SQL query 102 (or simply "query") and generate query results 104 in response to the received query 102. The SQL query processor 110 can include a cache manager 112, a query parser 114, a query optimizer 120, a query plan executor 116, and a plan cache 118. The plan cache 118 represents a fast-access memory space configured to store previously compiled query plans.

An incoming query 102 can be evaluated by the cache manager 112 to determine if the query 102 has a corresponding (compiled) query execution plan stored in the plan cache 118 (e.g., by looking up the plan cache 118). If the cache manager 112 finds no query execution plan in the plan cache 118 that corresponds to the query 102, the query 102 can be parsed, checked, and preprocessed by the query parser 114 to determine if the query 102 contains syntactic and/or semantic errors. After verifying that the query 102 is a valid transactional SQL statement that changes data (e.g., SELECT, INSERT, UPDATE, DELETE, MERGE, etc.), the query parser 114 can generate one or more query trees. Each query tree represents a corresponding query plan, which determines how the query 102 will be executed. The query optimizer 120, as described further below, can be configured to determine that, among a plurality of query plans that are generated based on respective query trees, which query plan is deemed to be the most optimal or efficient one (e.g., the one that is cheapest in terms of query cost calculated based on CPU usage, memory usage, etc.).

The determined query plan (e.g., denoted as 128) which is deemed to be the most optimal can be sent to the query plan executor 116 for execution. The query plan executor 116 can communicate with a data storage or memory space (e.g., a data persistency layer 106) and execute operators in the query plan 128 determined by the query optimizer 120.

As described herein, query compilation refers to the process of converting an incoming query 102 to the optimal query plan 128 (e.g., checking syntactic and/or semantic errors, generating query trees, and determining optimal query plan), as described above. Depending on the complexity of the query 102 (e.g., the number of joined tables, etc.) and the query optimization algorithm, query compilation time can be long (e.g., tens of seconds or more). Thus, to improve operational efficiency, the compiled optimal query plan 128 corresponding to the incoming query 102 can be stored in the plan cache 118 so that it can be quickly retrieved and reused if the same query 102 is submitted again in the future.

For example, if the cache manager 112 determines that the incoming query 102 has a corresponding query plan in the plan cache 118, that query plan can be retrieved directly from the plan cache 118 and forwarded to the query plan executor 116 for execution. Thus, in this scenario, operations by the query parser 114 and query optimizer 120 can be bypassed. In other words, the incoming query 102 does not need to be recompiled because its previously compiled query plan 128 is available in the plan cache 118.

As noted above, the plan cache 118 can store compiled query plans (e.g., 128). For an incoming query, the cache manager 112 can check if it has a compiled query execution plan stored in the plan cache 118. If yes, then this cached query plan can be reused. This can improve efficiency because it eliminates the time of compiling the query (i.e., regenerating the query plan). On the other hand, if the query has no compiled query plan stored in the plan cache 118, the query has to be compiled and optimized. The compiled optimal query plan 128 can then be stored in the plan cache 118 so that when the same query occurs again in the future, fast access to its cached query plan is feasible. In other words, the plan cache 118 can improve performance by keeping recent or often-used query plans in its cache memory which is faster or computationally cheaper to access than normal memory stores.

As described herein, the query optimizer 120 can be configured to implement a cost-based query optimization scheme. As shown, the query optimizer 120 can include a logical plan rewriter 122, a plan size estimator 124, a plan enumeration and algorithm assignment unit 125, a cost-based plan selector 126, and a runtime feedback manager 130. The runtime feedback manager 130 can further include a dictionary 132 and a storage for runtime statistics 134, as described more fully below.

The logical plan rewriter 122 can be configured to rewrite the original query (e.g., 102) to use materialized views (which contain already precomputed aggregates and joins) so as to improve operating efficiency. For example, rewriting the query can reduce the number of operations (e.g., by merging query operations, removing redundant joins, etc.).

The plan size estimator 124 can be configured to perform cost-bounded enumeration and size estimation. Specifically, the plan enumeration and algorithm assignment unit 125 can be configured to enumerate, within the constraint of a predefined cost threshold, a plurality of logical query plans (represented by query trees) to perform the query, and further generate physical query plans by annotating logical query plans with physical implementation details (e.g., by using relational algebra algorithms) Based on the generated logical and physical plans, the plan size estimator 124 can estimate or calculate the size of query plans. Then, the cost-based plan selector 126 can select the query plan 128 having the lowest estimated/calculated cost.

The runtime feedback manager 130 can be configured to capture the query tree representing the query plan selected by the cost-based plan selector 126. Additionally, the runtime feedback manager 130 can be configured to collect data statistics obtained after the selected query plan 128 is executed by the query plan executor 116. The collected data statistics can be stored in the runtime statistics 134 and mapped to the dictionary 132. As described more fully below, the dictionary 132 can include a plurality of keys corresponding to nodes of the query trees generated by the plan size estimator 124. The plan size estimator 124 can search the dictionary 132 for matching keys (and the corresponding statistics) for selected nodes in a query tree. The runtime statistics collected from executing the previous query plan can be feedbacked to the plan size estimator 124 for improved cost estimation when optimizing the next query. Additionally, the plan size estimator 124 can also identify alternative subtrees for any selected internal node of a query tree and propagate statistics across respective roots of the alternative subtrees, as described further below. In some circumstances, the dictionary 132 and runtime statistics 134 can be further stored in the persistency layer 106.

In practice, the systems shown herein, such as system 100, can vary in complexity, with additional functionality, more complex components, and the like. For example, there can be additional functionality within the SQL query processor 110. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the statistics (e.g., cardinalities, etc.), the query trees, the keys, the dictionary, and the like can be stored in one or more computer-readable storage media or computer-readable storage devices. The technologies described herein can be generic to the specifics of operating systems or hardware and can be applied in any variety of environments to take advantage of the described features.

Figure 2:
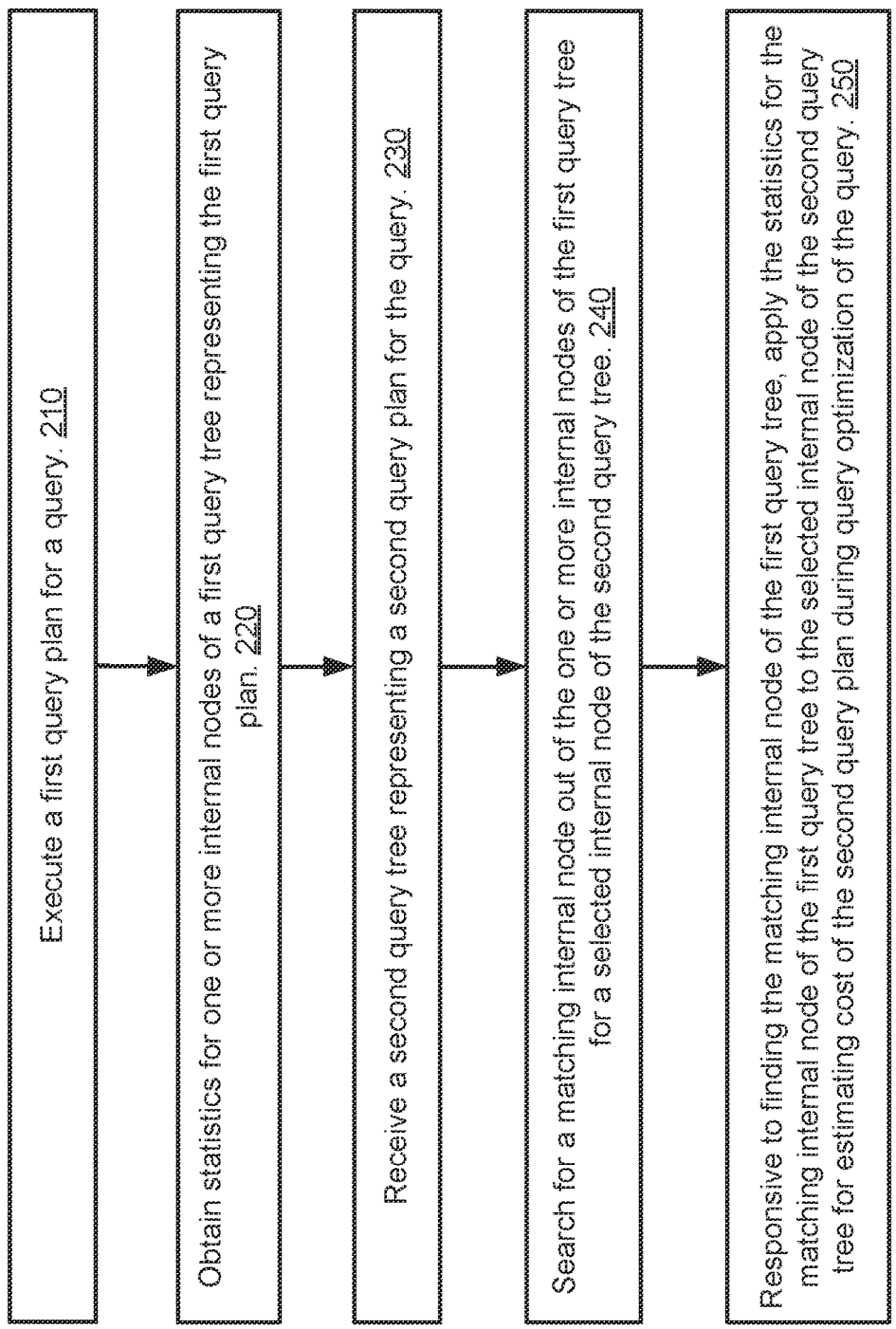
FIG. 2 is a flowchart illustrating an example overall method of implementing runtime query plan statistics feedback for query optimization.

Example 3—Example Overall Method of Implementing Runtime Statistics Feedback for Query Plan Cost Estimation FIG. 2 is a flowchart illustrating an overall method 200 of implementing runtime statistics feedback for query plan cost estimation, and can be performed, for example, by the system of FIG. 1. In one specific example, the method 200 can be implemented by the query optimizer 120 depicted in FIG. 1.

At 210, a first query plan (e.g., a query plan 128 selected by the query optimizer 120) for a query is executed (e.g., by the query plan executor 116).

At 220, statistics for one or more internal nodes of a first query tree representing the first query plan can be obtained. As described above, such runtime statistics can be stored (e.g., by the runtime feedback manager 130) and mapped to a dictionary (e.g., 132) containing keys representing internal nodes of the query tree.

At 230, a second query tree representing a second query plan for the query is received. The second query tree can be the same as or different from the first query tree.

At 240, for a selected internal node of the second query tree, the method 200 can search for a matching internal node out of the one or more internal nodes of the first query.

Then at 240, responsive to finding the matching internal node of the first query tree, the statistics for the matching internal node of the first query tree can be applied to the selected internal node of the second query tree for estimating cost of the second query plan during query optimization of the query.

Figure 3:
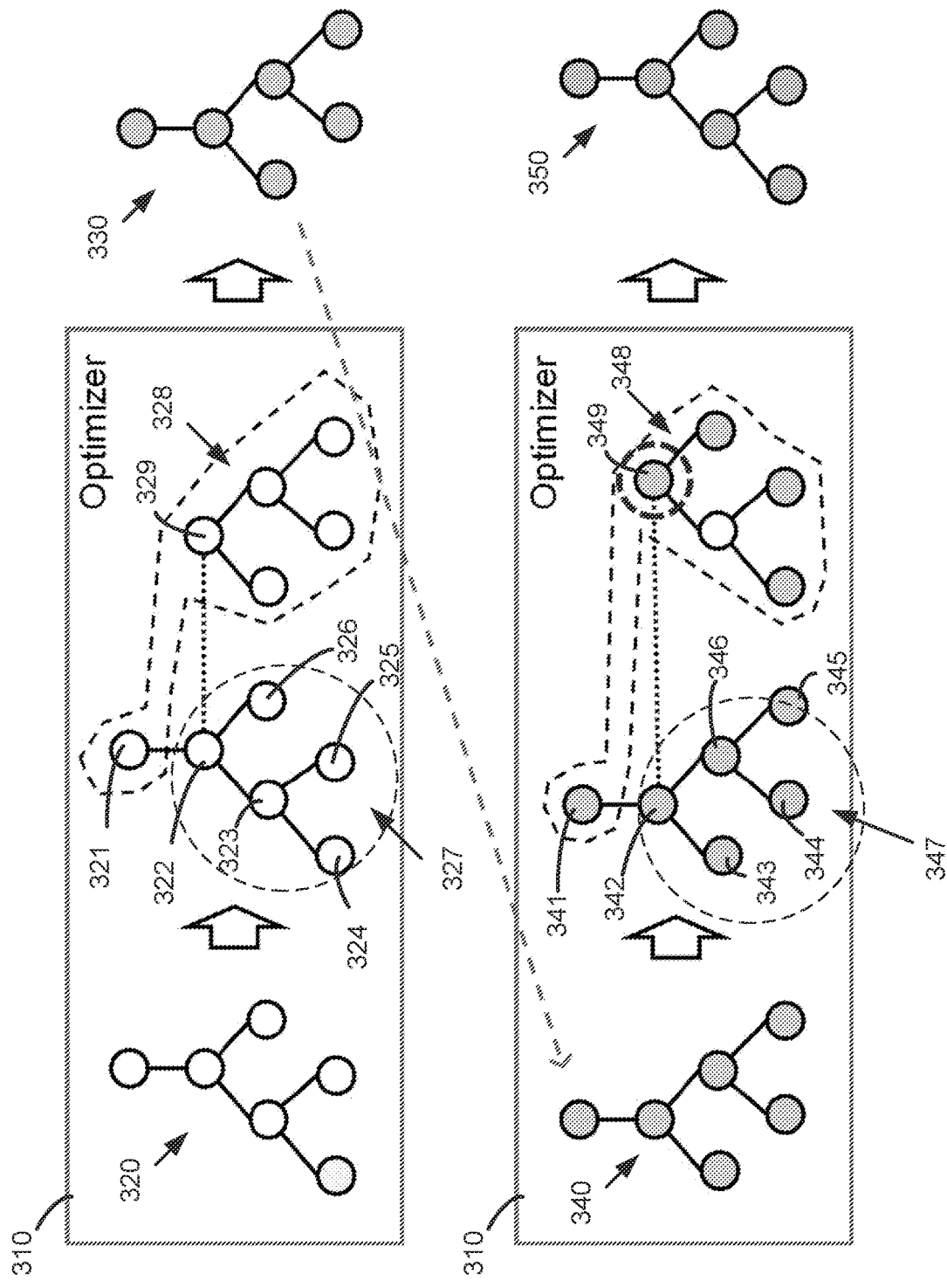
FIG. 3 is a schematic diagram illustrating a query optimizer using statistics collected in a previously executed query plan to generate a subsequent query plan for a query.

To illustrate, FIG. 3 schematically depicts a query optimizer 310 implementing the method 200. In the depicted example, the query optimizer 310 generates an initial query tree 320 representing an initial query plan for a query. The initial query tree 320 has a root node 321, two internal nodes 322, 323, and three leaf nodes 324, 325, 326. One of the internal nodes 322 is a child of the root node 321 and defines a subtree 327 (e.g., the node 322 is a root of the subtree 327). Using an equivalence rule, the query optimizer 310 finds an alternative or equivalent subtree 328 (having a root node 329) that is logically equivalent to the subtree 327. That is, executing the two subtrees 327 and 328 produces the same results. Thus, the query optimizer 310 can permute the initial query tree 320 to a permuted query tree 330 by replacing the subtree 327 with the equivalent subtree 328. The permuted query tree 330 represents an alternative query plan for the query.

The query optimizer 310 can calculate and compare costs of the initial query plan and the alternative query plan based on estimated statistics of nodes in the query trees 320, 330. Although statistics of the leaf nodes (e.g., 324, 325, 326) can be accurately calculated by scanning tables represented by the leaf nodes, estimating statistics for the internal nodes (e.g., 322, 323, 329, etc.) may introduce errors, as described above. Without any runtime statistics feedback, the query optimizer 310 can initially estimate statistics for the internal nodes, based on which to perform initial cost estimations for the initial query plan and the alternative query plan. In the depicted example, the alternative query plan represented by the permuted query tree 330 has a lower cost than the initial query plan represented by the initial query tree 320, and is selected for execution.

When the alternative query plan represented by the permuted query tree 330 is executed, data statistics can be collected for the internal nodes of the query tree 330. Such collected statistics can be used to assist subsequent query optimization for the query.

For example, assuming for the subsequently received query, the query optimizer 310 generates an initial query tree 340 representing an initial query plan for the query. In the depicted example, the initial query tree 340 is identical to the previously executed query tree 330. In other examples, the initial query tree 340 can be different from the previously executed query tree 330. As shown, the initial query tree 340 has a root node 341, two internal nodes 342, 343, and three leaf nodes 344, 345, 346. Using an equivalence rule, the query optimizer 310 can find an alternative subtree 348 (having a root node 349) that is logically equivalent to the subtree 347 of the internal node 342. Thus, the query optimizer 310 can permute the initial query tree 340 to a permuted query tree 350 by replacing the subtree 347 with the alternative subtree 348. The permuted query tree 350 represents an alternative query plan for the query.

Runtime statistics collected from the query tree 330 can be used to estimate data statistics for the query trees 340, 350. For example, for some of the internal nodes (e.g., 342, 346, 349, etc.) in the query trees 340, 350, matching nodes can be found in the previously executed query tree 330 (the method of finding matching nodes are described more fully below). Accordingly, runtime statistics collected from the internal nodes of the query tree 330 can be used to more accurately (compared to no runtime statistics feedback) determine statistics for the internal nodes of the query trees 340, 350. Based on more accurate data statistics, the query optimizer 310 can more accurately calculate the costs of different query plans. In the depicted example, the query plan represented by the query tree 350 has a lower cost than the query plan represented by the query tree 340, and is selected for execution.

Similarly, when the query plan represented by the query tree 350 is executed, data statistics can be collected for the internal nodes of the query tree 350, and such runtime statistics can be used to assist subsequent query optimization for the query. In other words, the runtime statistics feedback can be iterated.

Because the runtime statistics collected from the executed query plans can more accurately reflect data statistics of the internal nodes in the query trees, cost-based query optimization can be more accurate and adaptive. For example, when tables involved in a query are relatively stable (e.g., sizes and/or data distributions of the tables remain relatively stable), after one or more iterations, the query plan selected by the query optimizer 310 can converge to the optimal query plan having the lowest cost. On the other hand, when tables involved in a query change dynamically (e.g., sizes and/or data distributions of the tables change over time), iterations of runtime statistics feedback allow the query optimizer to adapt to the dynamic changes of the tables, thereby consistently selecting the optimal or nearly optimal query plan having the lowest or nearly lowest cost.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 4—Example Query Trees and Runtime Statistics Feedback

Figure 4:
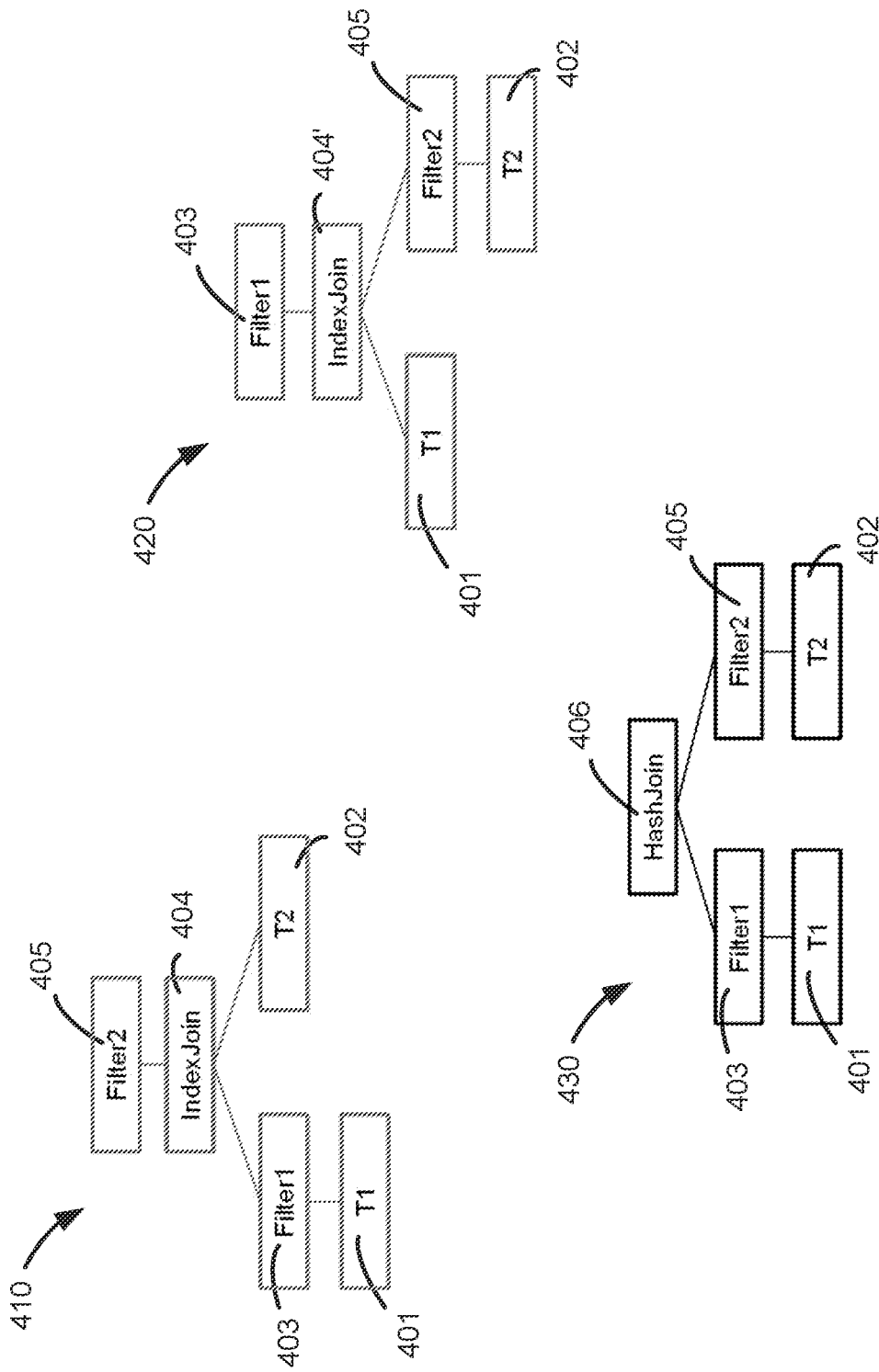
FIG. 4 depicts three example query trees representing three different query plans for a query.

To illustrate, FIG. 4 depicts three query trees 410, 420, 430 representing three different query plans generated for the same query.

As shown, the query tree 410 include two leaf nodes 401, 402 representing two tables (T1 and T2) and three internal nodes 403, 404, 405 representing three different operations (Filter1, Index Join, and Filter2, respectively). The query tree 420 also includes the same leaf nodes 401, 402 and internal nodes 403, 404', 405, but have a different topology or logical structure than the query tree 410. For example, while the internal node 405 representing Filter2 is the root node of query tree 410, the internal node 403 representing Filter1 is the root node of query tree 420. The query tree 430 also includes two leaf nodes 401 and 402, and three internal nodes 403, 405, 406. Different from query trees 410, 420, the root node 406 of query tree 430 represents a Hash Join operation.

The three query trees 410, 420, 430 represent different logical sequences to execute the query. For example, according the query plan represented by the query tree 410, table T1 (401) is first filtered by Filter1 (403). The resulting table of 403 is then joined with the table T2 (402) via Index Join (404). The resulting table of 404 is then filtered by Filter2 (405). The result of 405 is the query result. According to the query plan represented by the query tree 420, table T2 (402) is first filtered by Filter2 (405). The resulting table of 405 is then joined with the table T1 (401) via Index Join (404'). The resulting table of 404' is then filtered by Filter1 (403). The result of 403 is the query result. According to the query plan represented by the query tree 430, table T1 (401) is filtered by Filter1 (403) and table T2 (402) is filtered by Filter2 (405). The resulting tables of 403 and 405 are then joined together via Hash Join (406). The resulting table of 406 is the query result.

Although statistics of the leaf nodes 401, 402 can be accurately calculated by scanning tables T1 and T2, statistics for the resulting tables of the internal nodes (e.g., 403, 404, 404', 405, 406, etc.) are not available unless a query plan involving such internal nodes are executed. Without any runtime statistics feedback, a query optimizer can initially estimate statistics for the internal nodes, based on which to perform cost estimations for the corresponding query plans. Such estimated statistics can introduce errors (e.g., due to dependency between attributes, skewed data distribution, etc.), as described above. As a result, the cost estimation may be inaccurate and sub-optimal query plan may be selected. For example, the query optimizer may improperly select either the query plan represented by query tree 410 or the query plan represented by query tree 420 for execution, even though the query plan represented by query tree 430 would have the lowest actual cost (e.g., associated with the best performance and/or lowest execution time, etc.) if executed.

Using runtime statistics feedback as described above, statistics for the internal nodes of the query trees can be more accurately determined. As a result, even if the initially selected query plan is sub-optimal (e.g., a query plan represented by the query tree 410 or 420 is selected), after one or more iterations, the query optimizer can converge to the optimal query plan represented by the query tree 430.

Figure 5:
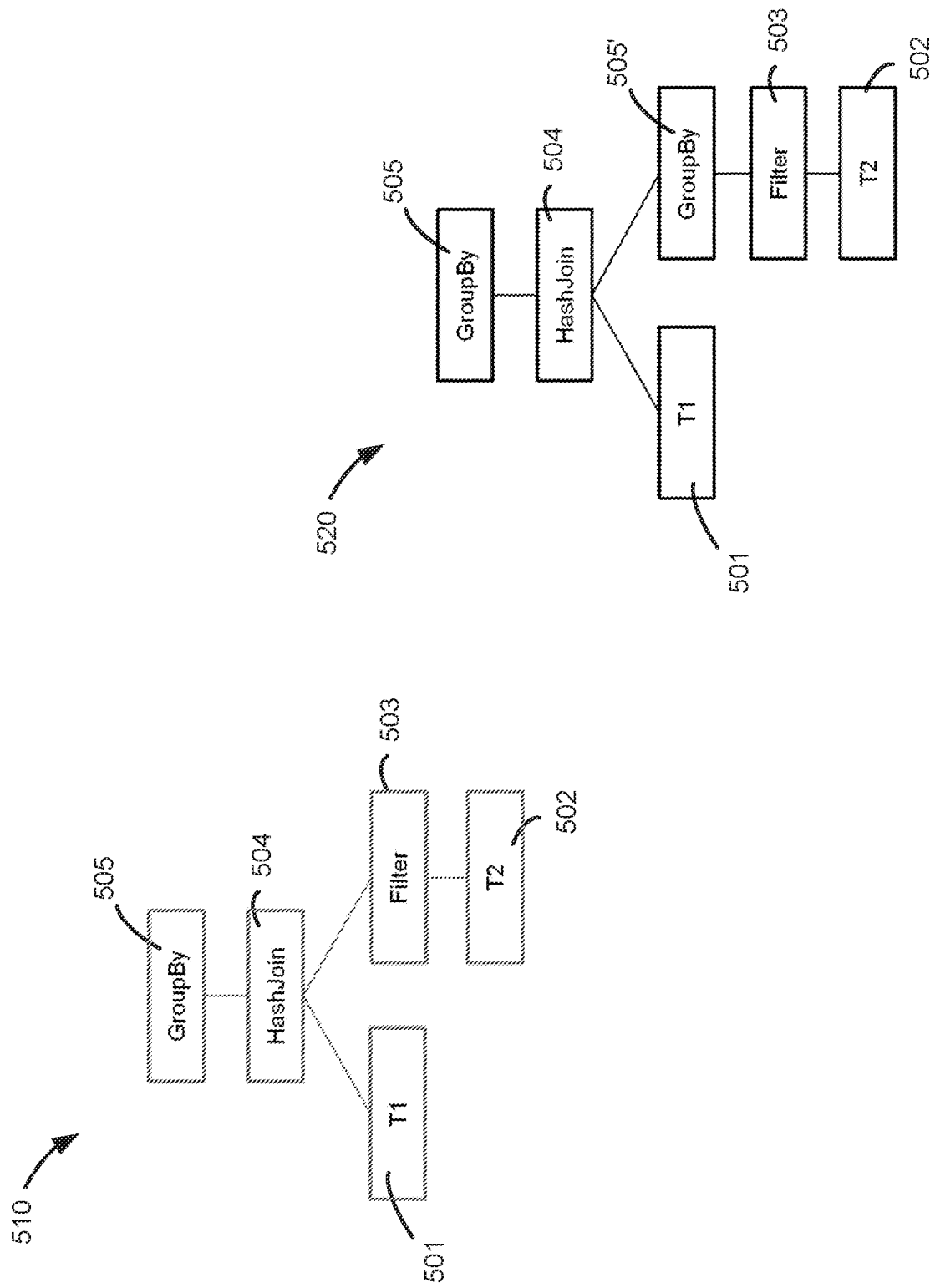
FIG. 5 depicts two example query trees representing two different query plans for a query.

As another example, FIG. 5 depicts two query trees 510, 520 representing two different query plans generated for the same query.

As shown, the query tree 510 include two leaf nodes 501, 502 representing two tables (T1 and T2) and three internal nodes 503, 504, 505 representing three different operations (Filter, Hash Join, and Group-By, respectively). The query tree 520 also includes the same leaf nodes 501, 502 and internal nodes 503, 504, 505. In addition, the query tree 520 includes a new internal node 505' which also represents a Group-By operation.

In some circumstances, the query optimizer can permutate the query tree 510 to generate the query tree 520 using relational algebra algorithms, and indicate the internal node 505' represents a pre-aggregation of the Group-By operation represented by the internal node 505. The Group-By operations represented by 505 and 505' share certain same grouping attributes or columns (the Group-By operation represented by 505' can have additional grouping columns than the Group-By operation represented by 505). In such circumstances, the query optimizer can deem the two Group-By operations represented by internal nodes 505 and 505' share the same grouping selectivity. The grouping selectivity is a ratio of number of records satisfying the Group-By operation (e.g., output rows) to number of total records (e.g., input rows). Thus, if the grouping selectivity is known for the internal node 505, the same grouping selectivity can be applied to the internal node 505', or vice versa.

Sharing grouping selectivity between internal nodes representing Group-By operations can be helpful for cost estimation of query plans. For example, after execution of a query plan represented by the query tree 510, statistics can be collected for the internal nodes 503, 504, and 505. When evaluating the cost of a subsequent query plan represented by the query tree 520, collected runtime statistics for the internal nodes 503, 504, and 505 can be used to determine statistics for the same internal nodes in the query tree 520. The statistics for the new internal node 505' can be derived from the internal node 505. For example, if the measured cardinality for the node 503 is C and the grouping selectivity for the node 505 is S, then the cardinality for the node 505' can be determined to be C x S because the nodes 505 and 505' share the same grouping selectivity S, and the input to node 505' is the result table of node 503.

Example 5—Example Method of Registering Nodes of a Query Tree in a Dictionary

According to certain examples, nodes of a query tree representing a previously executed query plan can be represented as corresponding keys and registered in a dictionary (e.g., 132). Collected runtime statistics (e.g., cardinality, distinct count, etc.) for the nodes can be mapped to respective keys in the dictionary. An example method of registering nodes of a query tree in a dictionary is described herein with reference to FIG. 6.

Figure 6:
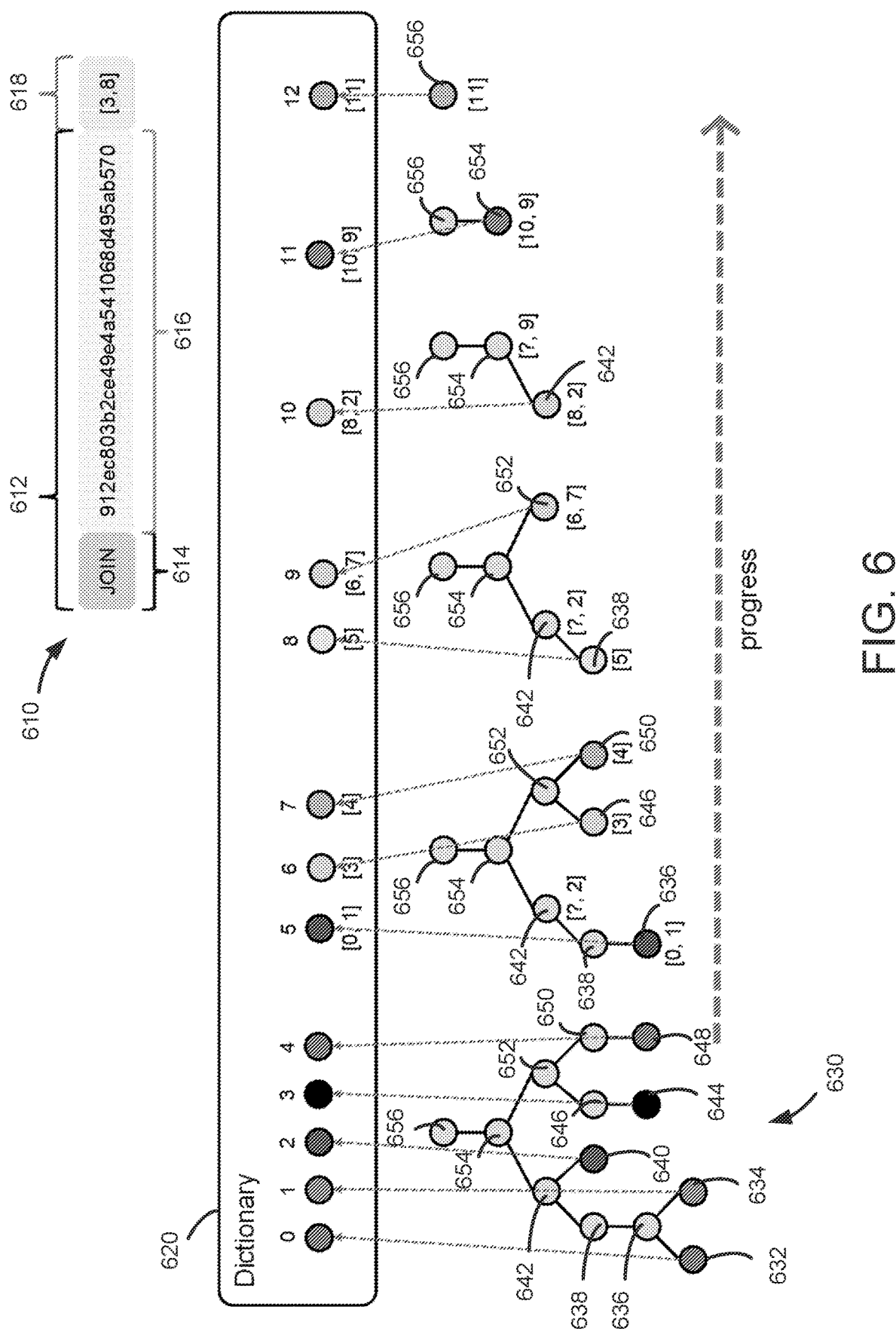
FIG. 6 is a schematic diagram illustrating registering keys corresponding to nodes of a query tree in a dictionary.

FIG. 6 depicts an example query tree 630 representing an executed query plan for a query. The query tree 630 includes five leaf nodes (e.g., 632, 634, 640, 644, 648) and eight internal nodes (e.g., 636, 638, 642, 646, 650, 652, 654, 656) including the root node 656. Each node in the query tree 630 can be represented by a unique key and registered in a dictionary 620. An example method of generating unique keys for the nodes is described further below.

The registration process can use a bottom-up approach, starting with the leaf nodes and ending with the root node. For example, each of the leaf nodes (e.g., 632, 634, 640, 644, and 648) can be represented by a key having a unique key identifier (e.g., 0, 1, 2, 3, and 4) and registered in the dictionary 620. In the depicted example, the key identifiers are numeric. In other examples, the key identifiers can have other data formats so long as they can uniquely identify the corresponding nodes.

After the leaf nodes are registered, internal nodes that are parents of the leaf nodes can be registered. For example, the internal node 636, which is the parent of leaf nodes 632 and 634, can be registered with a key identifier 5. The internal node 646, which is the parent of leaf node 644, can be registered with a key identifier 6. The internal node 650, which is the parent of leaf node 648, can be registered with a key identifier 7. In the depicted example, the key identifiers of child nodes for each internal node are shown in a pair of square brackets to denote the parent-child relationship between registered nodes.

Next, the parent nodes of these newly registered internal nodes can be registered. For example, the internal node 638, which is the parent of the internal node 636, can be registered with a key identifier 8. The internal node 652, which is the parent of the internal nodes 646 and 650, can be registered with a key identifier 9. Similar process can be repeated until the root node is registered. For example, the internal node 642, which is the parent of the internal node 638 and leaf node 640, can be registered with a key identifier 10. The internal node 654, which is the parent of the internal nodes 642 and 652, can be registered with a key identifier 11. Finally, the root node 656, which is the parent of the internal node 654, can be registered with a key identifier 12.

As described above, collected runtime statistics for the nodes can be mapped to respective keys in the dictionary. For example, runtime statistics for the internal nodes 636, 646, 650, 638, 652, 642, 654, and 656 can be mapped to respective keys with key identifiers 5, 6, 7, 8, 9, 10, 11, and 12, respectively. In certain examples, runtime statistics for the leaf nodes 632, 634, 640, 644, and 648 can also be mapped to respective keys with key identifiers 0, 1, 2, 3, and 4, respectively. In some examples, keys representing leaf nodes do not need to be mapped to runtime statistics. Instead, statistics for the leaf nodes can be calculated directly and on-demand (when estimating the cost of the query tree) by scanning the tables represented by the leaf nodes.

Example 6—Example Methods of Generating Keys for Nodes in a Query Tree

As described herein, each internal node represents an operation based on child nodes of the internal node. In various examples, the key for each internal node can be generated based on the operation represented by the internal node and child nodes of the internal node. The operation can be characterized by an operator and one or more operands. Example operands include column names (or attributes) of tables represented by the child nodes, numerical values representing limits and/or offsets, predicate strings for JOIN operations, expression strings for data filters, lists of strings for UNION column expression, lists of strings for aggregate functions, lists of strings for grouping expressions, lists of strings for sorting specification, etc.

As an example, FIG. 6 shows a generated key 610, which includes an operation signature 612 and a child key set 618. The operation signature 612 can include an operator name 614 (e.g., JOIN) and operation details 616. The operation details 616 can include detailed information about operands of the operator. In certain examples, the operation details 616 can be expressed in a string format. In other examples, the operation details 616 can be serialized into a byte stream. As depicted in FIG. 6, the operation details 616 can be represented by a hash value by applying a hash function to the operands.

The child key set 618 can include a list of key identifiers corresponding to the child nodes of the internal node. For example, the example key 610 has a child key set [3, 8], indicating the internal node represented by the key 610 has two child nodes with key identifiers 3 and 8, respectively.

In the depicted example, the operator name 614 is separate from the operation details 616. In other examples, the operator name and the operands can be serialized together (e.g., the operator name and the operands can be represented by a hash value). In some examples, the child key set 618 can also be serialized together with the operation details.

In certain examples, when generating the key (e.g., 610) for an internal node, the operation details can be normalized. Normalization can be helpful to ensure the generated key is unique for operations which are expressed differently but generate the same result. For example, the predicate order of operands having a conjunctive or disjunctive relationship can be normalized so that "A and B" and "B and A" can be represented in the same normal form. As another example, the predicate order of operands in a comparison can be normalized so that "A>B" and "B<A" can be represented in the same normal form.

In certain examples, keys can also be generated for leaf nodes of a query tree. The key for a leaf node can be configured to uniquely identify the table represented by the leaf node. For example, the key for a leaf node can be a string or a hash value generated based on the name of the table.

Example 7—Example Logically Equivalent Subtrees

FIGS. 7-10 depict another query tree 730 representing a new query plan for the same query of FIG. 6. The query tree 730 includes five leaf nodes (e.g., 732, 734, 740, 744, 746) and eight internal nodes (e.g., 736, 738, 742, 748, 750, 752, 754, 756) including the root node 756. As shown, the query tree 730 has a different logical structure than the query tree 630 (e.g., the subtree 710 associated with the internal node 752 has a different logical structure than the subtree associated with the internal node 652). In other examples, the new query plan can be the same as the previously executed query plan. In such circumstances, the query trees representing the new and old query plans can be the same.

FIGS. 7-10 also shows three alternative subtrees 760, 770, and 780 (e.g., generated by the query optimizer using various equivalent rules), which are determined to be logically equivalent to the subtree 710 associated with the internal node 752. Thus, each of the alternative subtrees 760, 770, and 780 can replace the subtree 710, leading to different query plans that generate the same query results. As shown, the subtree 760 includes two leaf nodes (e.g., 761, 762) and three internal nodes (e.g., 763, 764, 765) including the root node 765. The subtree 770 includes two leaf nodes (e.g., 771, 772) and two internal nodes (e.g., 773, 774) including the root node 774. The subtree 780 includes two leaf nodes (e.g., 781, 782) and three internal nodes (e.g., 783, 784, 785) including the root node 785. Because the subtrees 760, 770, and 780 are logically equivalent to the subtree 710, result tables for the root nodes (e.g., 752, 765, 774, and 785) of the subtrees are identical, thus having the same data statistics.

Although FIGS. 7-10 depict three alternative subtrees that are logically equivalent to the subtree 710, it should be understood that the number of alternative subtrees generated by the query optimizer can be more or less than three. For example, alternative subtrees can be generated for subtrees associated with any of the internal nodes 754, 742, 738, 736, 750, and 748. Generation of alternative subtrees can be iterative such that additional alternative subtrees can be generated for internal nodes of a previously generated alternative subtree. For example, additional alternative subtrees can be further generated for subtrees associated with any of the internal nodes 763, 764, 773, 784, 750, and 783.

Example 8—Example Method of Finding Matching Internal Nodes

As described above, after a query plan for a query is executed, internal nodes of a query tree (denoted as a "first query tree") representing the executed query plan can be registered in a dictionary with respective keys, and collected runtime statistics (e.g., cardinality, distinct count, etc.) of the internal nodes can be mapped to respective keys in the dictionary. Then, when a second query tree representing a subsequent query plan is received, the dictionary can be searched to find matching internal nodes of the first query tree for at least some of the internal nodes of the second query tree. Responsive to finding a matching internal node of the first query tree for a selected internal node of the second query tree, the collected runtime statistics for the matching internal node of the first query tree can be applied to the selected internal node of the second query tree for estimating cost of the second query plan during query optimization of the query. An example method for finding matching internal nodes, which also follows a bottom-up approach (e.g., from the leaf nodes to the root node), is described herein with reference to FIGS. 7-10.

Figure 7:
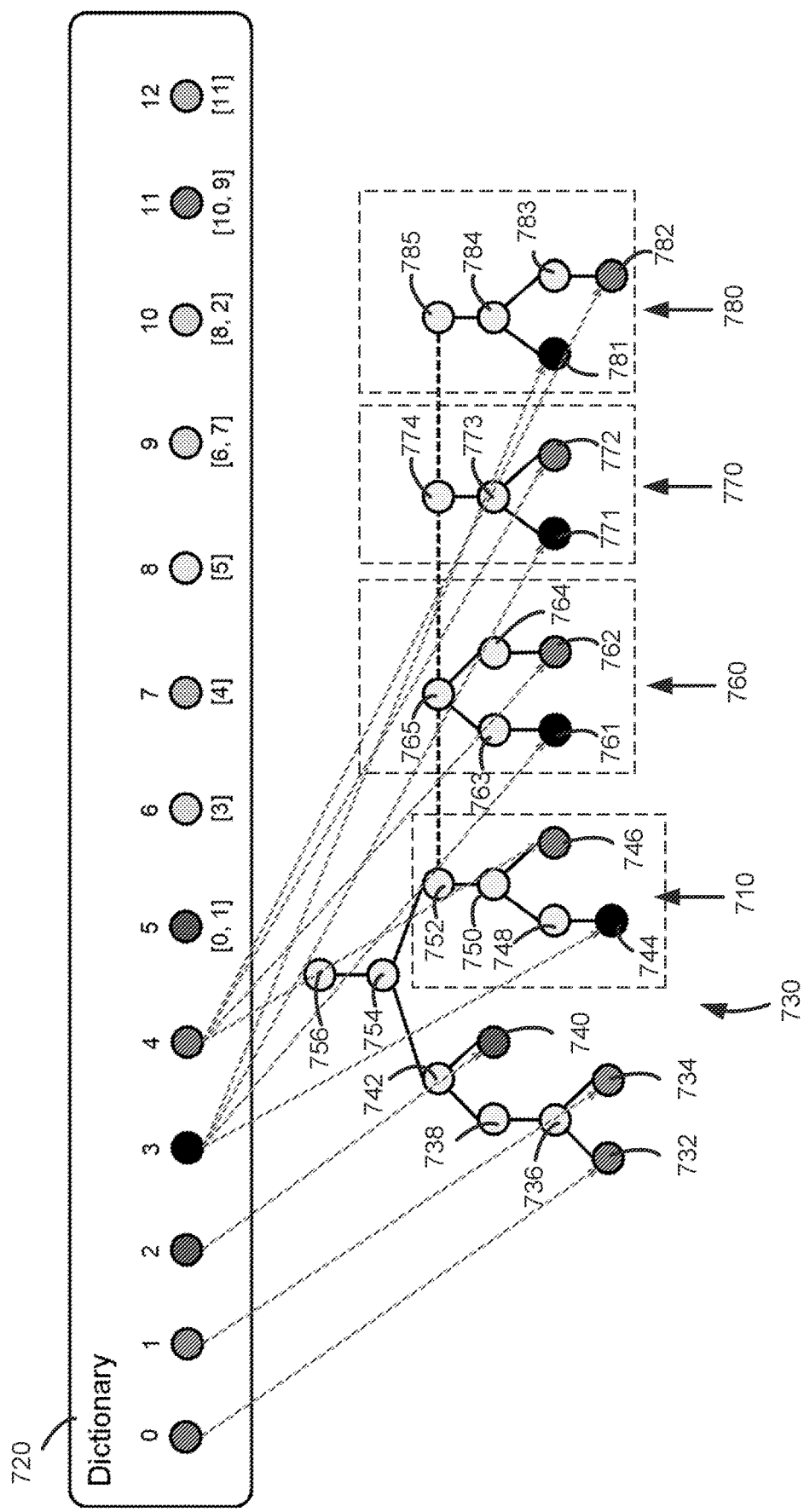
FIG. 7 is a schematic diagram illustrating finding matching keys in the dictionary for leaf nodes of a new query tree and leaf nodes in several alternative subtrees.

The dictionary 620 of FIG. 6 is replicated in FIGS. 7-10 and renumbered to 720. FIG. 7 depicts finding matching keys in the dictionary 720 for leaf nodes of the query tree 730 and alternative subtrees 760, 770, 780. As shown, matchings keys with key identifiers 0, 1, and 2 are found for the leaf nodes 732, 734, and 740, respectively. In other words, leaf nodes 732, 734, and 740 depicted in FIGS. 7-10 represent the same tables as the leaf nodes 632, 634, and 640 of FIG. 6. Similarly, leaf nodes 744, 761, 771, and 781 share a same matching key (key identifier=3), thus representing the same table as the leaf node 644 of FIG. 6. Similarly, leaf nodes 746, 762, 772, and 782 share a same matching key (key identifier=4), thus representing the same table as the leaf node 648 of FIG. 6. The key identifiers of the matching keys can be used to construct child key sets of parent internal nodes, as described below.

As described above, keys for the leaf nodes can be generated based on table names. Thus, finding matching keys in the dictionary can be performed based on comparison of table names (or their transformed hash values, etc.) represented by the leaf nodes.

Figure 8:
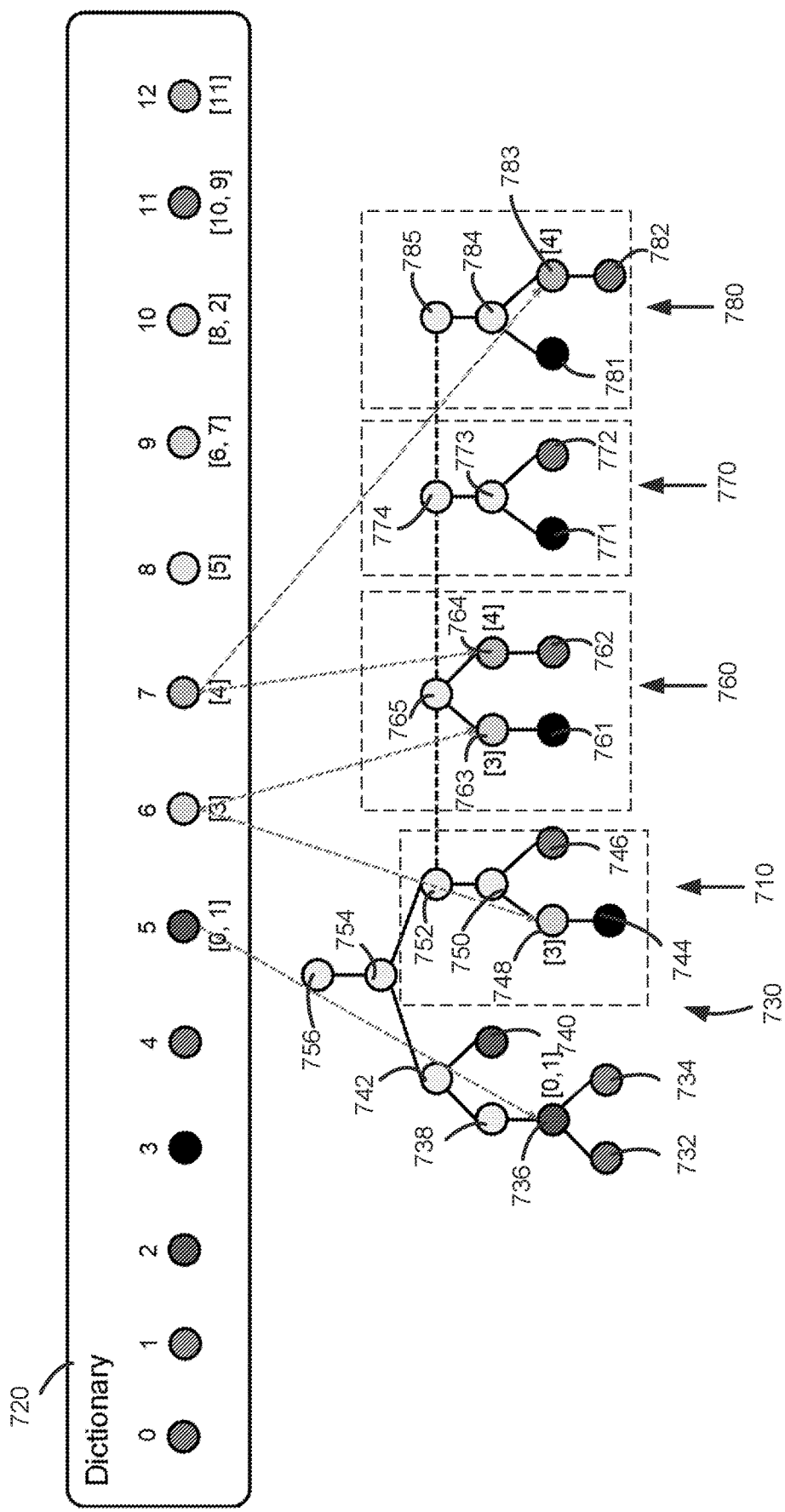
FIG. 8 is a schematic diagram illustrating finding matching keys in the dictionary for some of the internal nodes of the new query tree and some internal nodes in alternative subtrees.

FIG. 8 depicts finding matching keys in the dictionary 720 for some of the internal nodes, e.g., 736, 748, 763, 764, and 783. To find a matching key in the dictionary 720 for a selected internal node, a target key can be generated for the selected internal node, using the same method described above with reference to the example key 610 of FIG. 6. For example, the target key of the selected internal node can include an operation signature (which can include an operator name and operation details) and a child key set. The child key set can include a list of matching key identifiers corresponding to the child nodes of the internal node. In the depicted example, the internal node 736 has a child key set [0, 1], both the internal nodes 748 and 763 share a child key set [3], and the both the internal nodes 764 and 783 share a child key set [4].

Then the dictionary 720 can be searched to find a key that matches the target key. If it is found that the dictionary 720 contains a matching key for the selected internal node, previously collected runtime statistics mapped to the matching key can be applied to the selected internal node. Because the matching key was generated and registered based on an internal node of the query tree 630, such internal node of the query tree 630 can be deemed as a matching internal node for the selected internal node.

In the depicted example, the internal node 736 is found to have a matching key (key identifier=5), indicating the internal node 736 has a matching internal node 636 of FIG. 6. It is noted that the internal nodes 736 and 636 are logically equivalent because they represent the same operation and have equivalent child nodes (e.g., child nodes 732, 734 of the internal node 736 are equivalent to child nodes 632, 634 of the internal node 636). Similarly, both the internal nodes 748 and 763 are found to have a matching key (key identifier=6), indicating that both the internal nodes 748 and 763 share a matching internal node 646 of FIG. 6. Additionally, both the internal nodes 764 and 783 are found to have a matching key (key identifier=7), indicating that both the internal nodes 764 and 783 share a matching internal node 650 of FIG. 6. Similarly, these matching key identifiers can be used to construct child key sets of the parent internal nodes, as described above.

Figure 9:
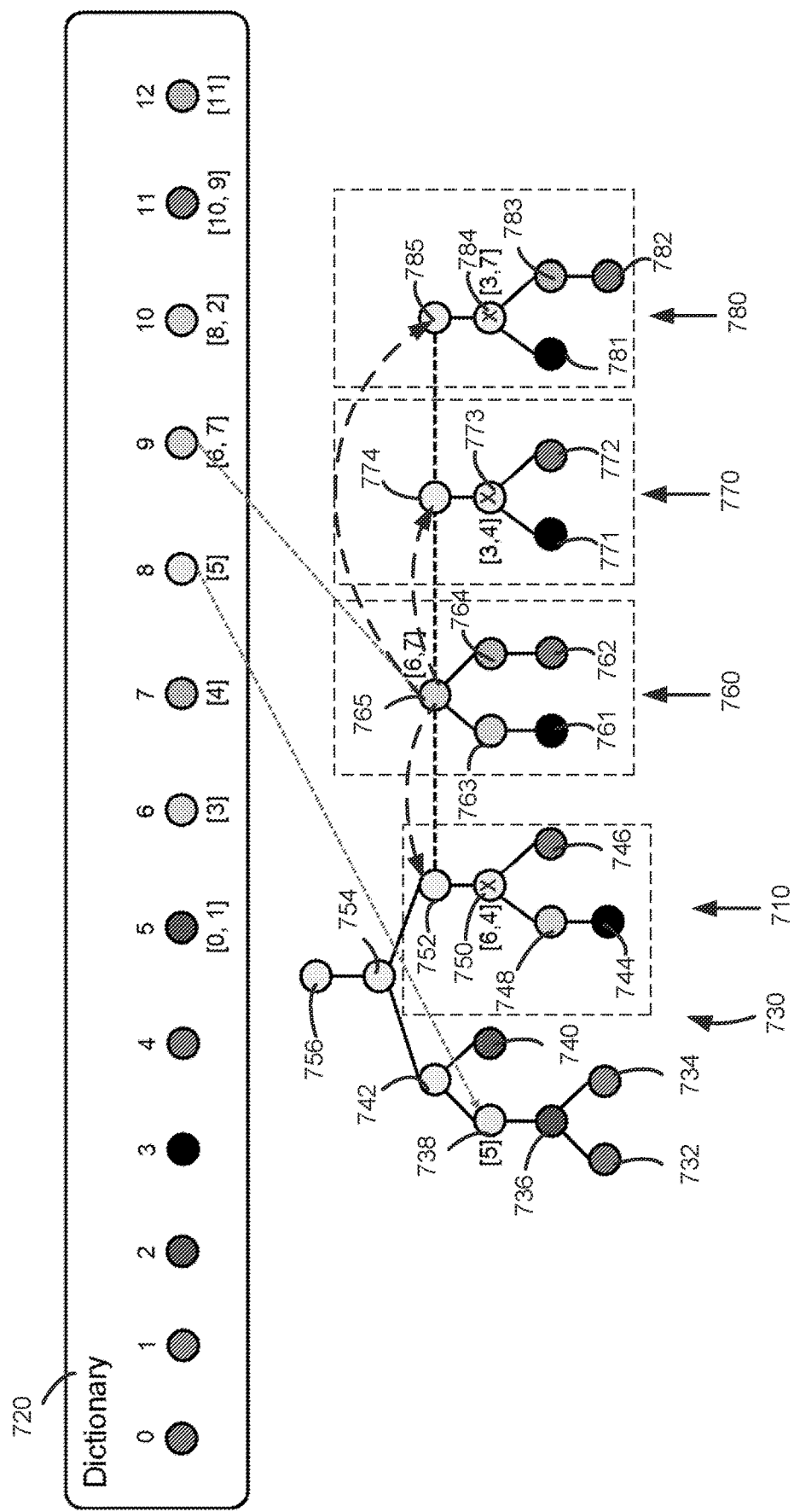
FIG. 9 is a schematic diagram illustrating finding matching keys in the dictionary for another internal node of the new query tree and a root node of an alternative subtree, and applying the matching key to the root nodes of other alternative subtrees.

Using the same approach, matching keys can be found for some other internal nodes. For example, FIG. 9 shows that a matching key (key identifier=8) is found for the internal node 738 (indicating the internal node 738 has a matching internal node 638 of FIG. 6), and another matching key (key identifier=9) is found for the internal node 765 (indicating the internal node 765 has a matching internal node 652 of FIG. 6).

In some circumstances, matching keys may not be found for some of the internal nodes. This can occur, e.g., if the target key of an internal node, which is generated based on the operation signature and child key set of the internal node, does not match any of the keys registered in the dictionary 720. In the example depicted in FIG. 9, six internal nodes 750, 773, 784, 752, 774, 785 have no matching keys during the initial search of the dictionary 720.

However, matching internal nodes 750, 773, 784, can still be found for some of the internal nodes (e.g., 752, 774, 785) that have no matching keys during initial search of the dictionary 720. For example, as described above, the root nodes of logically equivalent subtrees 710, 760, 770, 780 generate the same result (thus having the same table statistics). Accordingly, if any of the root nodes 752, 765, 774, and 785 is found to have a matching internal node in the query tree 630, that same matching internal node can be shared by all of the root nodes 752, 765, 774, and 785. In the depicted example, because the internal node 765 has a matching internal node 652, the three internal nodes 752, 774, and 785 all share the same matching internal node 652. Equivalently, the matching key (key identifier=9) for the node 765 is propagated to the nodes 752, 774, and 785 (i.e., the matching key for the node 765 can be designated to the nodes 752, 774, and 785). Thus, runtime statistics collected from the internal node 652 can also be applied to the internal nodes 752, 774, and 785.

Figure 10:
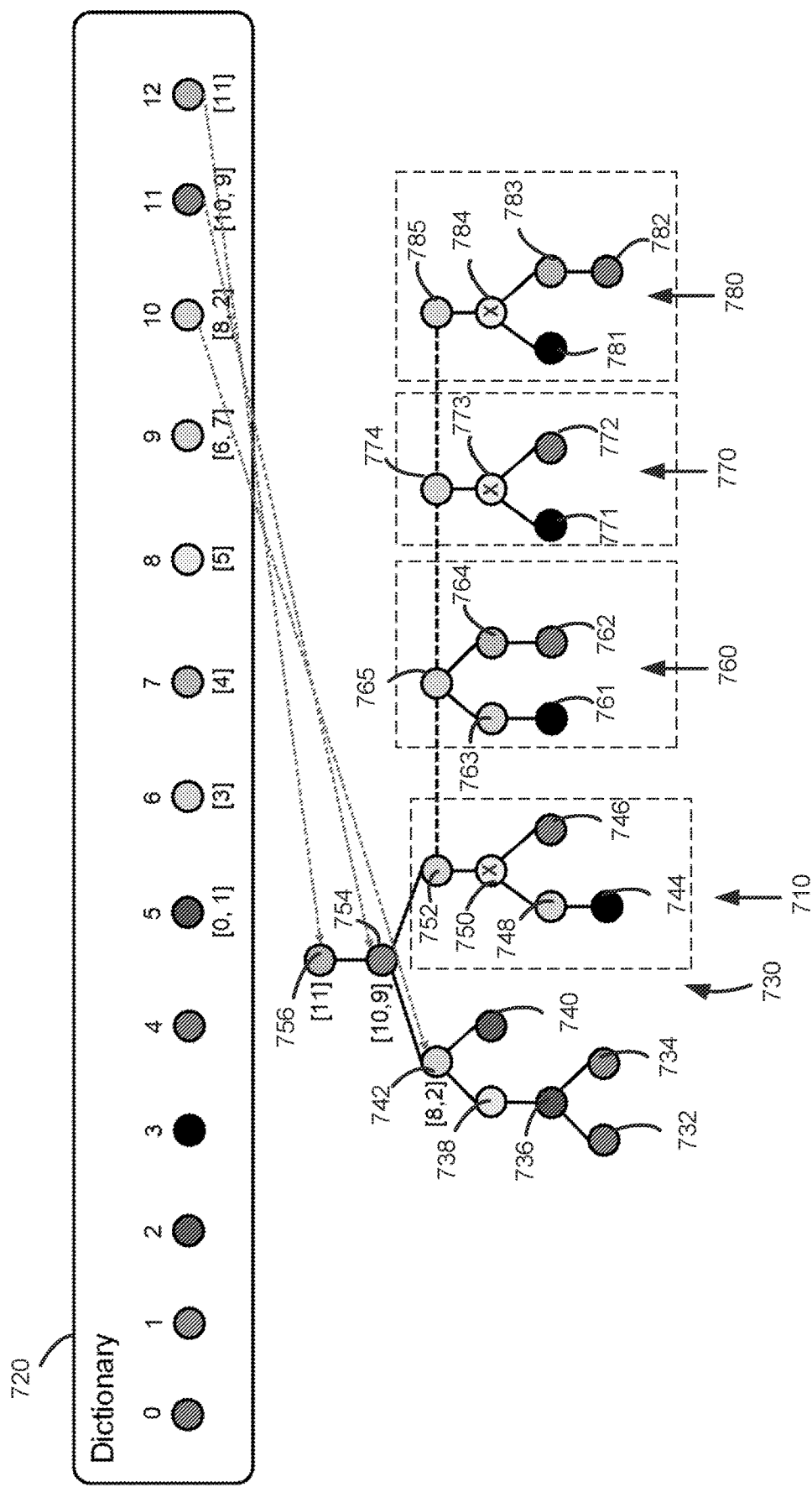
FIG. 10 is a schematic diagram illustrating finding matching keys in the dictionary for three other internal nodes of the new query tree.

FIG. 10 shows that matching keys can be found for three remaining internal nodes. For example, a matching key (key identifier=10) is found for the internal node 742 (indicating the internal node 742 has a matching internal node 642 of FIG. 6). The internal node 754 has two child nodes 742 and 752. Although the initial dictionary search does not find a matching key for the child node 752, because the subtrees 710 and 760 are logically equivalent, the matching key (key identifier=9) for the node 765 can be propagated to the node 752. Thus, to construct a target key for the internal node 754, the child key set of the internal node 754 can be set to [10, 9]. As a result, a matching key (key identifier=11) can be found for the internal node 754 (indicating the internal node 754 has a matching internal node 654 of FIG. 6). Thus, even if the initial dictionary search does not find a matching key for the node 752, a target key for its parent (i.e., the internal node 754) can still be generated based on a designated matching key for the node 752 (propagated from the node 765), thereby allowing a matching key for the parent internal node 754 to be found. Finally, a matching key (key identifier=12) can be found for the root node 756 (indicating the root node 756 has a matching internal node 656 of FIG. 6).

Thus, only three internal nodes (750, 773, 784) depicted in FIG. 10 do not have matching internal nodes in the query tree 630. The statistics of these internal nodes (also referred to as "unmatched internal nodes") can be estimated based on any known query statistics estimation methods because no runtime statistics can be directly applied to these unmatched internal nodes. However, even without direct application of runtime statistics to the unmatched internal nodes, estimation of statistics for the unmatched internal nodes can still be more accurate than conventional approaches where no runtime statistics is used at all.

For example, statistics of a parent node can be estimated based on statistics of its child nodes. In conventional approaches, statistics for the child nodes can have large estimation errors, which can be propagated to and/or amplified when estimating statistics for the parent node. By using runtime statistics feedback technology described herein, statistics of the child nodes can be more accurately determined (e.g., negligible or no errors) if the child nodes have matching internal nodes. As a result, the estimated statistics for the parent node can be more accurate. For example, the estimated statistics for the unmatched internal nodes 750, 773, 784 can be more accurate when the runtime statistics for their respective child nodes 748, 746, 771, 772, 781, 783 are available.

In addition, the estimation error of statistics for an unmatched internal node (if any) can be confined and not propagated to a parent node of the unmatched internal node, e.g., if the parent node has a matching internal node. For example, even if there are estimation errors of statistics for the unmatched internal nodes 750, 773, and 784, such estimation errors will not be propagated to their respective parent nodes 752, 774, and 785 because runtime statistics are available for the parent nodes 752, 774, and 785.

Further, in some circumstances, the estimation error of statistics for an unmatched internal node (if any) can be further reduced and/or capped if the parent node of the unmatched internal node has a matching internal node. For example, if there are estimation errors of table sizes (e.g., cardinalities) for the unmatched internal nodes 750, 773, and 784, such estimation errors can be capped by the runtime table sizes collected for their respective parent nodes 752, 774, and 785.

Example 9—Example Method of Updating Dictionary

As described herein, the process of runtime statistics feedback can be iterative. For example, if a query plan represented by the query tree 730 (or another query tree) is determined to have the lowest cost and selected by the query optimizer for execution, runtime statistics can be collected for such newly executed query plan. The collected runtime statistics can be further feedbacked to determine costs of subsequent query plans for the same query. And such runtime statistics feedback process can continue.

The dictionary (e.g., 720) can be dynamically be updated during the iterative runtime statistics feedback process. For example, responsive to executing the query plan represented by the query tree 730 as a result of query optimization of the query, runtime statistics for the internal nodes (e.g., 736, 738, 742, 748, 750, 752, 754, 756) of the query tree 730 can be collected. A new key uniquely identifying the unmatched internal node 750 can be generated (using the method key generation method described above) and registered in the dictionary 720 (e.g., with a new key identifier 13). The collected statistics for the unmatched internal node 750 can be mapped to the new key. Thus, by registering the new key corresponding to the unmatched internal node 750, the dictionary 720 is expanded to facilitate subsequent query plan optimization for the same query (e.g., an internal node of a subsequent query tree may find the new key as a matching key).

Example 10—Example Method of Updating Running Statistics

In certain examples, statistics mapped to respective keys of the dictionary (e.g., 720) can be dynamically updated during the iterative runtime statistics feedback process.

For example, responsive to executing the query plan represented by the query tree 730 as a result of query optimization of the query, runtime statistics for the internal nodes (e.g., 736, 738, 742, 748, 750, 752, 754, 756) of the query tree 730 can be collected. As described above, matchings keys with key identifiers 5, 6, 8, 9, 10, 11, and 12 can be respectively found for the internal nodes 736, 748, 738, 752, 742, 754, and 756 (note the matching key for the node 752 is propagated from the node 765). For these matching keys, their mapped statistics can be updated based on newly collected statistics for the corresponding internal nodes.

For example, the newly collected statistics for the internal nodes 736, 748, 738, 752, 742, 754, and 756 can be mapped to the corresponding matching keys with key identifiers 5, 6, 8, 9, 10, 11, and 12, respectively. In such circumstances, the newly collected runtime statistics for an internal node with a matching key replace the old runtime statistics for the internal node. Thus, only the most recent runtime statistics are used for a subsequent query plan optimization.

In some examples, the newly collected runtime statistics for an internal node with a matching key can be combined with the old runtime statistics for the internal node, and such combined statistics can be mapped to the matching key. For example, the combined statistics can be a weighted average of the newly collected runtime statistics and the old runtime statistics for the internal node, where the weights for the newly collected runtime statistics and the old runtime statistics can be predefined. In such circumstances, not only the most recent runtime statistics, but also some earlier runtime statistics, can be used in the feedback for a subsequent query plan optimization.

Example 11—Example Advantages

A number of advantages can be achieved via the technology described herein. As described above, cost-based query optimization needs to estimate statistics of internal nodes of query trees representing different query plans of a query. Estimation errors can occur due to various reasons. Moreover, estimation error in one internal node can propagate to a parent node of the internal node, resulting in a cascading effect that amplifies the errors. As a result, the estimated costs of query plans may not be accurate, and the query plan selected by a query optimizer may not be optimal, and in fact, can be very expensive, e.g., in terms of usage of system resources.

The technology described herein can more accurately determine data statistics for internal nodes of the query trees, thus allowing more accurate calculation of costs of query plans for a query. Because the runtime statistics collected from the executed query plans can more accurately reflect data statistics of the internal nodes in the query trees, cost-based query optimization can be more accurate and adaptive. For example, iterative runtime statistics feedback allows the output of a query optimizer to converge to the optimal query plan having the lowest cost and/or adapt to dynamic changes of data tables involved in the query.

The improved accuracy of query plan cost estimation not only results from direct usage of runtime statistics for matching internal nodes, but also benefits from improved estimation of statistics for unmatched internal nodes. As described above, even if runtime statistics is not available for an unmatched internal node, statistics for the unmatched internal node can still be more accurately estimated because the child nodes of the unmatched internal node can have runtime statistics. Further, any error (if any) in the estimated statistics for the unmatched internal node can be capped and not propagated to the parent node of the unmatched internal node if runtime statistics is available for the parent node.

The technology described herein uses a highly efficient dictionary approach to track internal nodes of executed query plans. Each internal node of an executed query plan can be registered in the dictionary as a corresponding key, which is mapped to runtime statistics collected from the internal node. During optimization of a subsequent query plan, the dictionary can be searched to find matching keys for internal nodes of the query plan. Even if an initial search of the dictionary does not find a matching key for an internal node, the technology described herein can designate a matching key for the internal node by propagating it from an alternative node associated with a logical equivalent subtree, so long as the alternative node has a matching key. The dictionary can be dynamically updated. Thus, as more query plans are executed, more internal nodes of the query plans can be registered in the dictionary, thus facilitating subsequent query plan optimizations.

Example 12—Example Computing Systems

Figure 11:
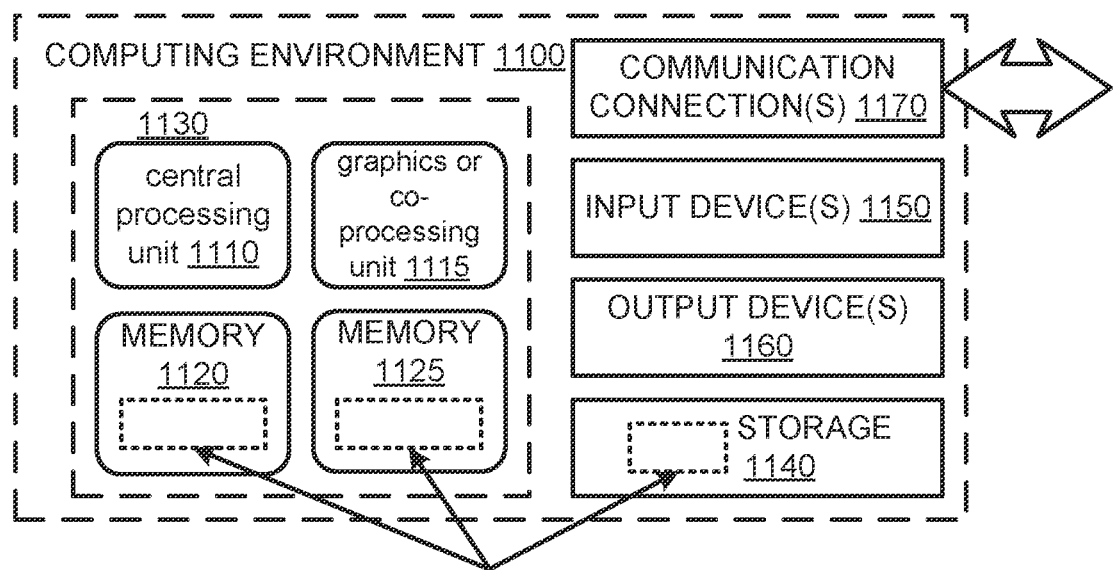
FIG. 11 is a block diagram of an example computing system in which described embodiments can be implemented.

FIG. 11 depicts an example of a suitable computing system 1100 in which the described innovations can be implemented. The computing system 1100 is not intended to suggest any limitation as to scope of use or functionality of the present disclosure, as the innovations can be implemented in diverse computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 can execute computer-executable instructions, such as for implementing the features described in the examples herein (e.g., the method 200). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 11 shows a central processing unit 1110 as well as a graphics processing unit or co-processing unit 1115. The tangible memory 1120, 1125 can be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 can store software 1180 implementing one or more innovations described herein, in the form of computer-executable instructions suitable for execution by the processing unit(s) 1110, 1115.

A computing system 1100 can have additional features. For example, the computing system 1100 can include storage 1140, one or more input devices 1150, one or more output devices 1160, and one or more communication connections 1170, including input devices, output devices, and communication connections for interacting with a user. An interconnection mechanism (not shown) such as a bus, controller, or network can interconnect the components of the computing system 1100. Typically, operating system software (not shown) can provide an operating environment for other software executing in the computing system 1100, and coordinate activities of the components of the computing system 1100.

The tangible storage 1140 can be removable or non-removable, and includes magnetic disks, magnetic tapes or cassettes, CD-ROMs, DVDs, or any other medium which can be used to store information in a non-transitory way and which can be accessed within the computing system 1100. The storage 1140 can store instructions for the software 280 implementing one or more innovations described herein.

The input device(s) 1150 can be an input device such as a keyboard, mouse, pen, or trackball, a voice input device, a scanning device, touch device (e.g., touchpad, display, or the like) or another device that provides input to the computing system 1100. The output device(s) 1160 can be a display, printer, speaker, CD-writer, or another device that provides output from the computing system 1100.

The communication connection(s) 1170 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 13—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 14—Example Cloud Computing Environment

Figure 12:
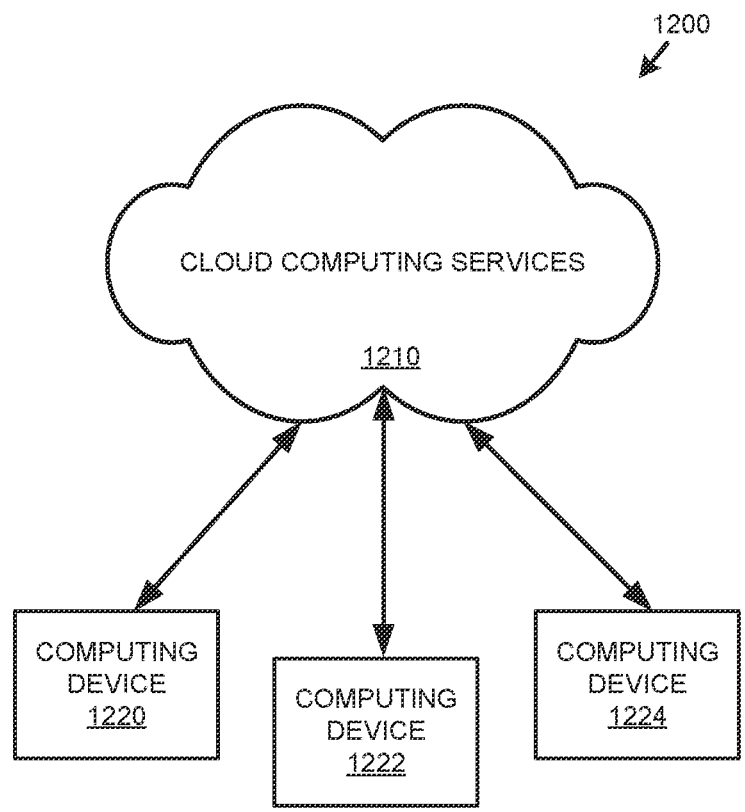
FIG. 12 is a block diagram of an example cloud computing environment that can be used in conjunction with the technologies described herein.

FIG. 12 depicts an example cloud computing environment 1200 in which the described technologies can be implemented, including, e.g., the system 100 and other systems herein. The cloud computing environment 1200 can include cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 can be utilized by various types of computing devices (e.g., client computing devices), such as computing devices 1220, 1222, and 1223. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operations (e.g., data processing, data storage, and the like).

In practice, cloud-based, on-premises-based, or hybrid scenarios can be supported.

Example 15—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example 16—Example Embodiments

Any of the following example embodiments can be implemented.

Example 1. A computer-implemented method comprising: executing a first query plan for a query; obtaining statistics for one or more internal nodes of a first query tree representing the first query plan; receiving a second query tree representing a second query plan for the query; for a selected internal node of the second query tree, searching for a matching internal node out of the one or more internal nodes of the first query tree; and responsive to finding the matching internal node of the first query tree, applying the statistics for the matching internal node of the first query tree to the selected internal node of the second query tree for estimating cost of the second query plan during query optimization of the query.

Example 2. The method of example 1, wherein obtaining statistics for an internal node of the first query tree comprises determining a cardinality of a table resulted from an operation represented by the internal node after executing the first query plan.

Example 3. The method of any one of examples 1-2, further comprising: generating keys uniquely identifying the one or more internal nodes of the first query tree; registering the keys in a dictionary; and mapping the keys to respective statistics for the one or more internal nodes of the first query tree.

Example 4. The method of example 3, wherein generating a key for an internal node of the first query tree comprises generating a signature for an operation represented by the internal node and identifying child nodes of the internal node.

Example 5. The method of example 4, wherein generating the signature comprises:

identifying an operator, one or more operands, and a predicate order of the one or more operands defined by the operation; and normalizing the predicate order of operands having a conjunctive or disjunctive relationship.

Example 6. The method of any one of examples 3-5, wherein searching for the matching internal node comprises: generating a target key for the selected internal node of the second query tree, searching the dictionary for a key that matches the target key.

Example 7. The method of any one of examples 3-6, wherein searching for the matching internal node comprises: selecting an alternative subtree that is logically equivalent to a subtree of the selected internal node of the second query tree; generating a target key for a root of the alternative subtree; and searching the dictionary for a key that matches the target key.

Example 8. The method of any one of examples 3-7, further comprising: responsive to executing the second query plan as a result of query optimization of the query, obtaining statistics for one or more internal nodes of the second query tree; identifying an unmatched internal node of the second query tree that has no matching internal node of the first query tree; generating a new key uniquely identifying the unmatched internal node; registering the new key in the dictionary; and mapping the new key to the statistics for the unmatched internal node of the second query tree.

Example 9. The method of any one of examples 3-8, further comprising: responsive to executing the second query plan as a result of query optimization of the query, obtaining statistics for one or more internal nodes of the second query tree; finding a matching key in the dictionary identifying the matching internal node of the first query tree corresponding to the selected internal node of the second query tree; and mapping the matching key to the statistics for the selected internal node of the second query tree.

Example 10. The method of any one of examples 1-9, further comprising: identifying a first internal node and a second internal node of the second query tree, wherein the first internal node represents a group-by operation having a known selectivity, wherein the second internal node represents a pre-aggregation of the group-by operation represented by the first internal node; and applying the known selectivity of the first internal node to the second internal node.

Example 11. A computing system, comprising: memory; one or more hardware processors coupled to the memory; and one or more computer readable storage media storing instructions that, when loaded into the memory, cause the one or more hardware processors to perform operations comprising: executing a first query plan for a query; obtaining statistics for one or more internal nodes of a first query tree representing the first query plan; receiving a second query tree representing a second query plan for the query; for a selected internal node of the second query tree, searching for a matching internal node out of the one or more internal nodes of the first query tree; and responsive to finding the matching internal node of the first query tree, applying the statistics for the matching internal node of the first query tree to the selected internal node of the second query tree for estimating cost of the second query plan during query optimization of the query.

Example 12. The system of example 11, wherein the statistics for an internal node of the first query tree comprises a cardinality of a table resulted from an operation represented by the internal node after executing the first query plan.

Example 13. The system of any one of examples 11-12, wherein the operations further comprise: generating keys uniquely identifying the one or more internal nodes of the first query tree; registering the keys in a dictionary; and mapping the keys to respective statistics for the one or more internal nodes of the first query tree.

Example 14. The system of example 13, wherein a key for an internal node of the first query tree comprises a signature for an operation represented by the internal node and identifiers of child nodes of the internal node.

Example 15. The system of example 14, wherein the signature comprises an operator and operands defined by the operation, wherein operands having a conjunctive or disjunctive relationship are normalized.

Example 16. The system of any one of examples 13-15, wherein the operation for searching for the matching internal node comprises: generating a target key for the selected internal node of the second query tree; and searching the dictionary for a key that matches the target key.

Example 17. The system of any one of examples 13-16, wherein the operation for searching for the matching internal node comprises: selecting an alternative subtree that is logically equivalent to a subtree of the selected internal node of the second query tree; generating a target key for a root of the alternative subtree; and searching the dictionary for a key that matches the target key.

Example 18. The system of any one of examples 13-17, wherein the operations further comprise: responsive to executing the second query plan as a result of query optimization of the query, obtaining statistics for one or more internal nodes of the second query tree; identifying an unmatched internal node of the second query tree that has no matching internal node of the first query tree; generating a new key uniquely identifying the unmatched internal node;

registering the new key in the dictionary; and mapping the new key to the statistics for the unmatched internal node of the second query tree.

Example 19. The system of any one of examples 13-18, wherein the operations further comprise: responsive to executing the second query plan as a result of query optimization of the query, obtaining statistics for one or more internal nodes of the second query tree; finding a matching key in the dictionary identifying the matching internal node of the first query tree corresponding to the selected internal node of the second query tree; and mapping the matching key to the statistics for the selected internal node of the second query tree.

Example 20. One or more non-transitory computer-readable media having encoded thereon computer-executable instructions causing one or more processors to perform a method comprising: executing a first query plan for a query; obtaining cardinalities for one or more internal nodes of a first query tree representing the first query plan; receiving a second query tree representing a second query plan for the query; for a selected internal node of the second query tree, searching for a matching internal node out of the one or more internal nodes of the first query tree; and responsive to finding the matching internal node of the first query tree, applying the cardinality for the matching internal node of the first query tree to the selected internal node of the second query tree for estimating cost of the second query plan during query optimization of the query.

Example 17—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method comprising:
   executing a first query plan for a query;
   obtaining statistics for one or more internal nodes of a first query tree representing the first query plan;
   receiving a second query tree representing a second query plan for the query;
   for a selected internal node of the second query tree, searching for a matching internal node out of the one or more internal nodes of the first query tree;
   responsive to finding the matching internal node of the first query tree, applying the statistics for the matching internal node of the first query tree to the selected internal node of the second query tree for estimating cost of the second query plan during query optimization of the query;
   identifying a first internal node and a second internal node of the second query tree, wherein the first internal node represents a group-by operation having a known selectivity, wherein the second internal node represents a pre-aggregation of the group-by operation represented by the first internal node; and
   applying the known selectivity of the first internal node to the second internal node.

2. The method of claim 1, wherein obtaining statistics for an internal node of the first query tree comprises determining a cardinality of a table resulted from an operation represented by the internal node after executing the first query plan.

3. The method of claim 1, further comprising:
   generating keys uniquely identifying the one or more internal nodes of the first query tree;
   registering the keys in a dictionary; and
   mapping the keys to respective statistics for the one or more internal nodes of the first query tree.

4. The method of claim 3, wherein generating a key for an internal node of the first query tree comprises generating a signature for an operation represented by the internal node and identifying child nodes of the internal node.

5. The method of claim 4, wherein generating the signature comprises:
   identifying an operator, one or more operands, and a predicate order of the one or more operands defined by the operation; and
   normalizing the predicate order of operands having a conjunctive or disjunctive relationship.

6. The method of claim 3, wherein searching for the matching internal node comprises:
   generating a target key for the selected internal node of the second query tree; and
   searching the dictionary for a key that matches the target key.

7. The method of claim 3, wherein searching for the matching internal node comprises:
   selecting an alternative subtree that is logically equivalent to a subtree of the selected internal node of the second query tree;
   generating a target key for a root of the alternative subtree; and
   searching the dictionary for a key that matches the target key.

8. The method of claim 3, further comprising:
   responsive to executing the second query plan as a result of query optimization of the query, obtaining statistics for one or more internal nodes of the second query tree;
   identifying an unmatched internal node of the second query tree that has no matching internal node of the first query tree;
   generating a new key uniquely identifying the unmatched internal node;
   registering the new key in the dictionary; and
   mapping the new key to the statistics for the unmatched internal node of the second query tree.

9. The method of claim 3, further comprising:
   responsive to executing the second query plan as a result of query optimization of the query, obtaining statistics for one or more internal nodes of the second query tree;
   finding a matching key in the dictionary identifying the matching internal node of the first query tree corresponding to the selected internal node of the second query tree; and
   mapping the matching key to the statistics for the selected internal node of the second query tree.

10. A computing system, comprising:
    memory;
    one or more hardware processors coupled to the memory; and
    one or more computer readable storage media storing instructions that, when loaded into the memory, cause the one or more hardware processors to perform operations comprising:
    executing a first query plan for a query;

obtaining statistics for one or more internal nodes of a first query tree representing the first query plan;

receiving a second query tree representing a second query plan for the query;

for a selected internal node of the second query tree, searching for a matching internal node out of the one or more internal nodes of the first query tree;

responsive to finding the matching internal node of the first query tree, applying the statistics for the matching internal node of the first query tree to the selected internal node of the second query tree for estimating cost of the second query plan during query optimization of the query;

identifying a first internal node and a second internal node of the second query tree, wherein the first internal node represents a group-by operation having a known selectivity, wherein the second internal node represents a pre-aggregation of the group-by operation represented by the first internal node; and applying the known selectivity of the first internal node to the second internal node.

11. The system of claim 10, wherein the statistics for an internal node of the first query tree comprises a cardinality of a table resulted from an operation represented by the internal node after executing the first query plan.

12. The system of claim 10, wherein the operations further comprise:

generating keys uniquely identifying the one or more internal nodes of the first query tree;

registering the keys in a dictionary; and mapping the keys to respective statistics for the one or more internal nodes of the first query tree.

13. The system of claim 12, wherein a key for an internal node of the first query tree comprises a signature for an operation represented by the internal node and identifiers of child nodes of the internal node.

14. The system of claim 13, wherein the signature comprises an operator and operands defined by the operation, wherein operands having a conjunctive or disjunctive relationship are normalized.

15. The system of claim 12, wherein the operation for searching for the matching internal node comprises:

generating a target key for the selected internal node of the second query tree, searching the dictionary for a key that matches the target key.

16. The system of claim 12, wherein the operation for searching for the matching internal node comprises:

selecting an alternative subtree that is logically equivalent to a subtree of the selected internal node of the second query tree;

generating a target key for a root of the alternative subtree; and searching the dictionary for a key that matches the target key.

17. The system of claim 12, wherein the operations further comprise:

responsive to executing the second query plan as a result of query optimization of the query, obtaining statistics for one or more internal nodes of the second query tree;

identifying an unmatched internal node of the second query tree that has no matching internal node of the first query tree;

generating a new key uniquely identifying the unmatched internal node;

registering the new key in the dictionary; and mapping the new key to the statistics for the unmatched internal node of the second query tree.

18. The system of claim 12, wherein the operations further comprise:

responsive to executing the second query plan as a result of query optimization of the query, obtaining statistics for one or more internal nodes of the second query tree;

finding a matching key in the dictionary identifying the matching internal node of the first query tree corresponding to the selected internal node of the second query tree; and mapping the matching key to the statistics for the selected internal node of the second query tree.

19. One or more non-transitory computer-readable media having encoded thereon computer-executable instructions causing one or more processors to perform a method comprising:

executing a first query plan for a query;

obtaining cardinalities for one or more internal nodes of a first query tree representing the first query plan;

receiving a second query tree representing a second query plan for the query;

for a selected internal node of the second query tree, searching for a matching internal node out of the one or more internal nodes of the first query tree;

responsive to finding the matching internal node of the first query tree, applying the cardinality for the matching internal node of the first query tree to the selected internal node of the second query tree for estimating cost of the second query plan during query optimization of the query;

identifying a first internal node and a second internal node of the second query tree, wherein the first internal node represents a group-by operation having a known selectivity, wherein the second internal node represents a pre-aggregation of the group-by operation represented by the first internal node; and applying the known selectivity of the first internal node to the second internal node.

* * * * *